United States Patent [19]
DeJule et al.

[11] Patent Number: 5,319,477
[45] Date of Patent: Jun. 7, 1994

[54] COMPACT POLARIZATION INDEPENDENT OPTICAL SWITCHING UNITS

[75] Inventors: Michael C. DeJule, Clifton Park, N.Y.; Thomas L. Credelle, Los Gatos, Calif.; Nabeel A. Riza, Clifton Park; Donald E. Castleberry, Schenectady, both of N.Y.

[73] Assignee: General Electric Company, Schenectady, N.Y.

[21] Appl. No.: 994,011

[22] Filed: Dec. 21, 1992

[51] Int. Cl.$^5$ .................. G02F 1/1335; H01Q 3/34
[52] U.S. Cl. .................................. 359/42; 359/140; 342/375
[58] Field of Search .............. 359/42, 41, 140, 251, 359/7; 342/374, 375

[56] References Cited

U.S. PATENT DOCUMENTS

| | | | |
|---|---|---|---|
| 4,478,494 | 10/1984 | Soref | 359/42 |
| 4,836,658 | 6/1989 | Laycock | 359/7 |
| 5,117,239 | 5/1992 | Riza | 342/375 |
| 5,231,405 | 7/1993 | Riza | 342/375 |

OTHER PUBLICATIONS

Wagner & Cheng, "Electrically Controlled Optical Switch for Multimode Fiber Applications", Applied Optics, Sep. 1, 1980, vol. 19, No. 17, pp. 2921–2925.

Primary Examiner—William L. Sikes
Assistant Examiner—Huy Mai
Attorney, Agent, or Firm—Marvin Snyder

[57] ABSTRACT

A compact optical switching unit includes a polarization independent beamsplitter switch (PIBS) coupled to a delay path apparatus such that incident light beams are respectively selectively directed along either a direct path or a delay path dependent on the the manipulation of the polarization of polarized constituent light beams in the PIBS. The delay path apparatus is typically a mirror prism or fiber optic cable disposed such that light deflected onto the delay path traverses a longer distance than light passing along the direct path and thus a particular light beam can be selectively time delayed by controlling the PIBS to direct the beam into desired delay paths in a cascade of optical signal switching units. A compact and readily fabricated cascade of optical switching units includes PIBS blocks, a portion of which constitutes the PIBS in respective optical switching units sequentially optically coupled. Delay path apparatuses disposed along an axis orthogonal to both the axis of beams passing along a direct path through polarizing beam splitter switches on the direct path and the axis between respective optical switching units result in a compact optical architecture.

20 Claims, 5 Drawing Sheets

FIG. 2 (A) (PRIOR ART)
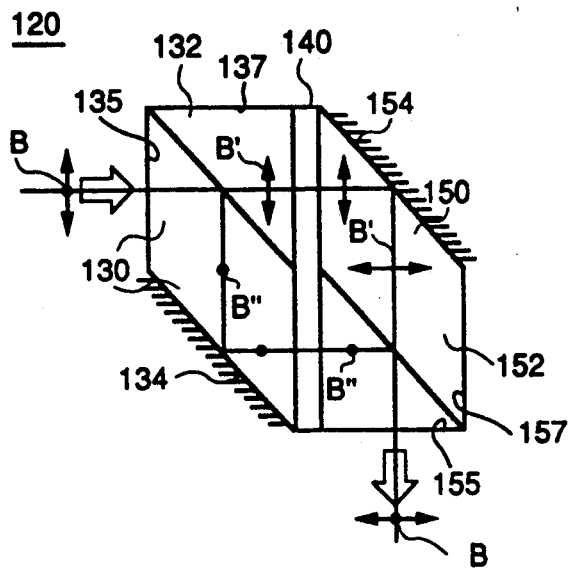
FIG. 2 (B) (PRIOR ART)
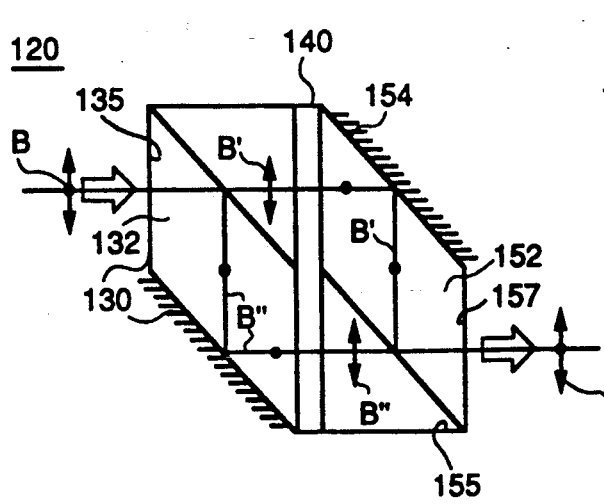
FIG. 2 (C) (PRIOR ART)
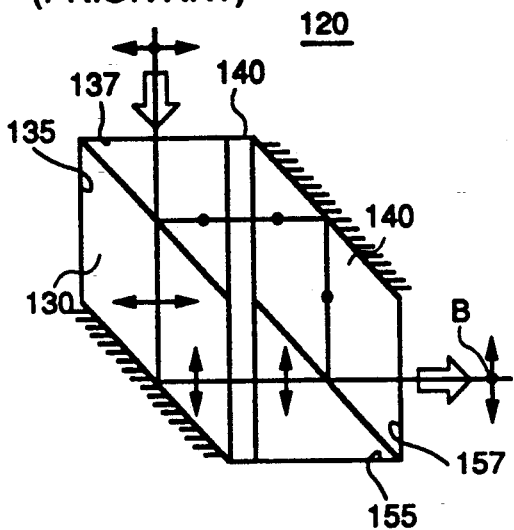
FIG. 2 (D) (PRIOR ART)
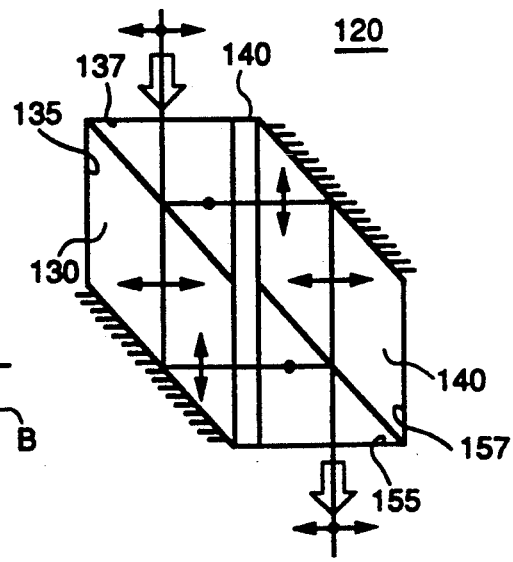

COMPACT POLARIZATION INDEPENDENT OPTICAL SWITCHING UNITS

RELATED APPLICATIONS AND PATENTS

This application is related to the application entitled "Compact Polarization Dependent Optical Switching Units", Ser. No. 07/994,012 (RD-21,313), filed concurrently with this application and assigned to the assignee of the present application, and which is incorporated herein by reference.

BACKGROUND OF THE INVENTION

Optical signal processing systems are used to manipulate the characteristics of optical signals, or light beams, to enable information or signals to be processed. For example, the direction, intensity, polarization, phase, or a combination of these characteristics of a light beam may be manipulated by appropriate equipment so that the manipulated characteristics impart the desired processing of the optical signal. For example, optical signal processing systems can be advantageously used for controlling phased array radars. In such a system, differentially time-delayed optical signals can be generated to establish selected time delays between individual optical signal beams, and the optical signals can then be converted to electrical signals to drive the antenna array with the desired sequential actuation of the transmitting antenna elements.

An essential component in most optical processing systems, such as phased array antenna controllers, is an efficient light switch. A key characteristic of a light switch used in a signal processing system, in which the processed light must commonly pass through many switches, is the amount of optical loss or attenuation that the light beam experiences in passing through the switch. A commonly used light switch is a lithium niobate based switch that provides relatively fast switching times but typically also has about 3 dB light loss per switch. Thus, for example, if an optical signal passed through only seven switches in a signal processing system, it would lose 21 dB, that is the light amplitude of the output signal drops to 1/128th of the input amplitude.

One efficient, low loss, light switch includes a beam splitter and a liquid crystal array to selectively control the polarization of light beams entering the beams splitter. One example of switching using polarizing beam splitters (PBS) and liquid crystal arrays to selectively control the polarization of light entering the PBSs is disclosed in U.S. Pat. No. 5,117,239 of N. Riza, issued May 26 1992 and which is assigned to the assignee of the present application and incorporated herein by reference. For example, separate spatial light modulators (SLMs) comprising arrays of liquid crystals can be paired with sets of paired polarizing beam splitters in optical time delay units such that light passing through the unit passes along either a direct path or a delay path dependent on the polarization of the light.

Additionally, polarization-independent types of beamsplitter switches have been suggested that enable a non-polarized light beam to be selectively directed along a predetermined path. One example of such a polarization-independent switch is described by Wagner and Cheng in "Electrically Controlled Optical Switch For Multimode Fiber Applications," Applied Optics, Vol. 19, No. 17, September 1980, pp 2921-2925. In optical signal processing systems, use of polarization independent switches can be advantageous as the there is no reduction in light beam intensity (as may occur if a polarizer is used to polarize light to be used in a polarization-dependent system) and connections between modules of the signal processing system can be made with optical fibers that do not require polarization-maintaining fibers.

It is desirable that switching units in optical signal systems have relatively low attenuation, be of compact size, rugged, readily fabricated and adapted to processing a large number of separate signal light beams as would be necessary for operation of a phased array antenna system. It is further desirable, from the standpoint of manufacturing ease and efficiency, that each optical switch comprise as few optical devices, such as beamsplitters, as practicable. Additionally, it is desirable to have a switching unit that can readily be fabricated to produce a small time delay.

It is accordingly an object of this invention to provide a polarization independent optical switching unit having relatively low light attenuation and that is readily adapted to use in a cascade of other optical processing devices.

It is a further object of this invention to provide a polarization independent optical switching unit that is compact and rugged and that can be readily fabricated in a cascade of similar devices.

It is a still further object of this invention to provide an arrangement for a polarization independent optical switching unit that is readily adapted to generating small time delays between respective optical signal beams.

SUMMARY OF THE INVENTION

In accordance with this invention an optical signal control system is provided which includes at least one optical switching unit having a polarization independent beamsplitter switch (PIBS) coupled to a delay path apparatus such that light incident on the optical switching unit passes through it either along a direct path or along a delay path dependent on which of two input axes the light enters the PIBS and on the polarization rotation applied to the light beams passing through PIBS. Each PIBS includes an input switch unit coupled to a spatial light modulator (SLM) that is in turn coupled to an output switch unit. Each delay path apparatus, such as an optical fiber strand or a corner prism/mirror arrangement, is coupled to receive light from an output switch unit of a corresponding optical switching unit PBS and to direct the light along a delay path to an input switch unit of an optical switching unit. Each SLM typically comprises an array of independently controllable liquid crystal pixels.

A plurality of optical switching units are typically sequentially coupled together in cascade. In one embodiment, a delay path apparatus is coupled between the output switch unit of a PIBS in one optical switching unit and the input switch unit of the PIBS in the next sequential optical switching unit; in an alternative embodiment, a delay path apparatus is coupled to receive light from the output switch unit of the PIBS in one optical switching unit and to direct the light along the delay path into the input switch unit of the same optical switching unit. In another embodiment, at least a portion of the optical switching units coupled together in cascade are disposed along a first axis and each of the input switch units and output switch units in sequentially coupled optical switching units comprise adjoining contiguous portions of respective input and output switch blocks. Similarly, respective SLMs in PIBSs in sequentially coupled optical switching units may comprise adjoining contiguous portions of a polarization rotation switch block.

In a cascade of optical switching units disposed along a first axis, respective time delay apparatuses in one embodiment are "folded", that is, disposed along respective axes not aligned with the first axis such that light passing along direct and delay paths in the cascade is deflected in all three dimensions. In a further embodiment, the delay path apparatuses are aligned along a second axis that is orthogonal but coplanar with the first axis; in an alternative embodiment, the first and second axes are disposed in respective mutually orthogonal planes.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

FIGS. 2(A) through 2(D) are schematic diagrams of a polarization independent beamsplitter switch in accordance with the prior art.

DETAILED DESCRIPTION OF THE INVENTION

Figure 1:
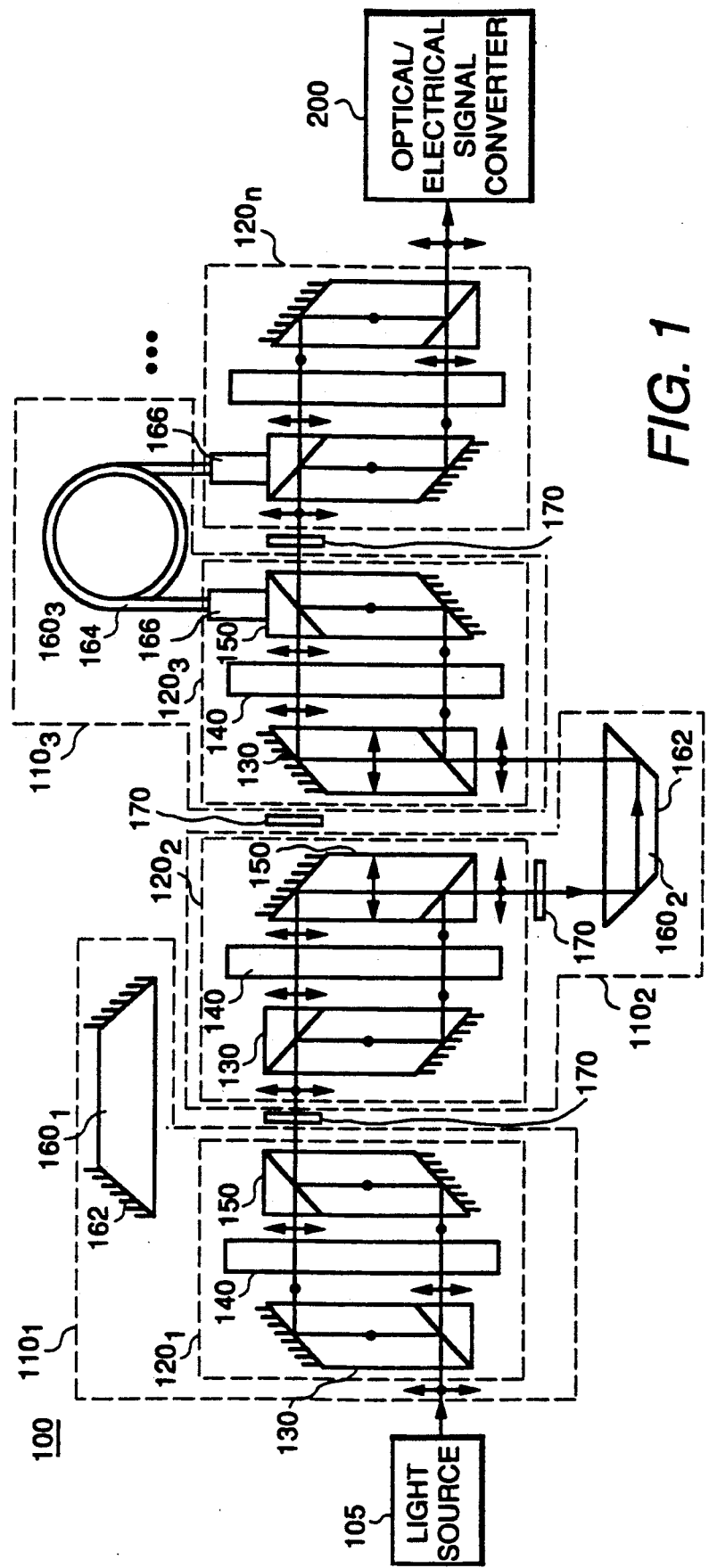
FIG. 1 is a schematic diagram of one embodiment of a portion of an optical signal processing system comprising the present invention.

FIG. 1 illustrates a portion of an optical signal processing system 100 as used in a phased array radar or the like and which comprises a light source 105, a plurality of optical switching units $110_1$–$110_n$ optically coupled in a cascade arrangement, and an optical/electrical signal conversion circuit 200. As used herein, "cascade arrangement" refers to two or more components optically coupled such that light beams can pass sequentially from one component to the next component to which it is coupled.

Optical signal processing system 100 typically is used to generate a number of differentially time delayed optical signals (or light beams) that, when converted to corresponding electrical signals, drive respective elements in an antenna array (not shown). Light source 105 typically comprises a laser adapted to provide light beams of the appropriate intensity required for use in the processing system. Light source 105 typically further comprises one or more collimating lenses (not shown) disposed to receive light from the laser and to collimate the light into a plurality of collinear light beams which pass into first optical switching unit $110_1$. Optical/electrical conversion circuit 200 typically comprises photodetectors and associated electrical components, such as amplifiers, mixers, and filters (not shown), to generate electrical signals corresponding to the processed optical signals.

Each optical switching unit 110 comprises a respective polarization independent beamsplitter switch (PIBS) 120 optically coupled to a delay path apparatus 160. Each PIBS 120, as illustrated in FIGS. 2(A)–2(B), typically comprises an input switch unit 130 optically coupled to a spatial light modulator 140 which is in turn optically coupled to an output switch unit 150. Input switch unit 130 comprises an input polarizing beamsplitter (PBS) 132 coupled to an associated reflector 134; output switch unit 150 similarly comprises an output PBS 152 coupled to an associated reflector 154. For purposes of explanation of the present invention, and not limitation, a cube PBS is described in which light is typically deflected at 90° angles, dependent on its linear polarization. Alternatively, other types of PBSs can be used, such as Thompson PBSs, in which the deflection angle of linearly polarized light is other than 90°, with the appropriate adjustment of the optical architecture to adjust for the different light paths. As used herein, "PBS" refers to the entire PBS assembly, not just the interface of the prisms at which light beam separation occurs.

Spatial light modulator 140 typically comprises a two-dimensional array of liquid crystal pixels which are individually controllable and comprise nematic liquid crystals, ferro-electric liquid crystals, or the like. Each pixel is illuminated by at least one light beam passing from light source 105 (for ease of discussion, it will be assumed that one light beam passes from each pixel). The pattern of the two-dimensional (2-D) array of liquid crystal pixels in SLM 140 corresponds to the desired electrical output; for example, the pattern typically corresponds to the 2-D array of antenna elements that are independently actuated by signals generated by optical signal processing system 100 (FIG. 1).

Each delay path apparatus 160 (FIG. 1) comprises a mirror prism 162, or alternatively, a similar light deflection device such as a fiber optic cable 164 (illustrated in delay assembly $110_3$) or the like. A lens 166 such as a GRIN (graded index) such as a SELFOC lens or the like, is advantageously used to couple each end of the optical fiber to the respective PIBS. Each delay path apparatus 160 is coupled to a respective PIBS 120 such that light passing along a selected axis from output switch unit 150 of that PIBS is directed along a delay path in which the light is deflected and enters the respective input switch unit 130 of the PIBS in the next sequential optical switching unit. The distance between the mirror prism 162 and the associated PIBS to which it is coupled, or the length of fiber optic cable 164, as appropriate, determines the length of the delay path that the deflected light beam must travel before entering the next sequentially coupled optical switching unit and determines the amount of time delay a particular delay assembly 110 imparts to a deflected beam.

In FIG. 1 each delay path apparatus 160 is illustrated with a gap, such as an air gap, between it and the associated PIBS; alternatively, the coupling of light beams between the associated PIBS and mirror prism 162 may be via glass or the like (not shown) which has an optical index substantially the same as the material of which output PBS 152 is made. Additional optical devices such as lenses (not shown) can also be disposed in the path between the respective PIBSs and delay path apparatus coupled thereto in order to ensure that the plurality of light beams passing through the optical signal processing system remain aligned along selected paths such that they each pass through predetermined pixels in each SLM in each PIBS in the cascade.

Collimation of the plurality light beams passing through the cascade of optical switching units is desirable to minimize crosstalk. An optical lens 170, or alternatively a lens array, can be advantageously optically coupled in the optical architecture between optical switching units to maintain the collimation of the lights. Additional lenslet arrays 170 can be disposed in delay path apparatus as illustrated in optical switching unit $110_2$ in FIG. 1.

The conventional PIBS illustrated in FIGS. 2(A)-2(D) enables non-polarized light incident on a first or a second input face 135, 137, respectively, on the switch to be selectively switched to either a first or a second output face 155, 157, respectively. By way of example and not limitation, a representative unpolarized light beam "B" is illustrated in FIG. 2(A) incident on first input face 135 of PIBS 120. This unpolarized light beam comprises both "p" polarized, or horizontally linearly polarized (the electric vector of the light is parallel to the plane of incidence, i.e., the plane of the page as illustrated in FIGS. 2 and indicated by the twin headed arrows shown on the light beam line), and "s" polarized, or vertically linearly polarized, i.e., oriented orthogonal to the plane of the page, as illustrated by the dots in the Figure.

Beam B is split into constituent beams of opposite linear polarization in PBS 132, noted in FIG. 2(A) as B' and B". Beam B' passes through input switch unit 130 along substantially the same path as incident beam B and into a respective pixel in SLM 140; beam B" is deflected in PBS 132 such that it is incident on reflector 134 and deflected further into a different respective pixel in SLM 140. In FIG. 2(A)-2(D), cube PBSs are shown, hence the angles of deflection are typically about 90°. As illustrated in FIG. 2(A), the two respective pixels in SLM 140 through which beams B' and B" pass are set to not cause a polarization rotation, thus the constituent light beams B' and B" maintain their original respective linear polarizations as they emerge from SLM 140 into output switch unit 150. Beam B' is incident on reflector 154 and is deflected into output PBS 152; beam B" passes from SLM 140 directly into output PBS 152. The polarization of beam B' is such that when it is incident on the beamsplitter in PBS 152, it passes directly through undeflected; by contrast, beam B", which is of the opposite linear polarization, is deflected when it strikes the beamsplitter in PBS 152 and thus the two constituent beams are again combined into one unpolarized beam B that passes from output PBS 152 through first output face 155 and that is oriented (e.g., as illustrated, perpendicular) along a path which is orthogonal to the path of the incident light beam on first switching unit 130.

FIG. 2(B) illustrates PIBS 120 with the respective pixels in SLM 140, through which the polarized constituent beams of incident light beam B pass, set to cause a 90° polarization rotation. The operation is as described above with the exception that beam B' undergoes a 90° polarization shift in SLM 140 from p-polarized to s-polarized, and thus when this beam is deflected into output PBS 152 by reflector 154, beam B' is again deflected by 90° towards second output face 157. Similarly, beam B" is shifted from s-polarized to p-polarized light in SLM 140 and thus passes directly through output PBS 152 to be combined with beam B'. The recombined beam B passes from second output face 157.

FIGS. 2(C) and 2(D) illustrate the operation of PIBS 120 with SLM 140 pixels set for no rotation and 90° rotation, respectively, when light beam B is incident on input switching unit 130 through second input face 137. The operation is identical to that described above with the exception that the no-polarization rotation SLM 140 setting results in the output beam emerging from second output face 157 and the polarization-rotation SLM 140 setting results in recombined beam B emerging from first output face 155.

In accordance with this invention, a plurality of optical switching units 110 are sequentially coupled together as illustrated in FIG. 1 such that light emerging from one of the two output faces of the respective PIBS 120 is directed along a delay path into the respective delay path apparatus 160, or alternatively, light emerging from the other output face of the PIBS passes along a direct path into the PIBS of the next succeeding optical switching unit in the cascade. As described above, the output face from which recombined beam B passes from the PIBS for a beam incident on a given input face is selected by the settings of the SLM pixels through which the constituent beams pass in the PIBS.

For example, as illustrated in FIG. 1, light source 105 is optically coupled to first optical switching unit $110_1$ such that unpolarized collimated light beams are incident on input switching unit 130 of first switching unit PIBS $120_1$. (for ease of discussion, particular components in a given optical switching unit will be referenced by the subscript of the respective optical switching unit). The respective pixels in SLM 140 in first switching unit PIBS $120_1$ are set to cause a polarization rotation such that the recombined beam passes from output switching unit 150 along an axis that constitutes the direct path into second optical switching unit $110_2$. In second optical switching unit PIBS $120_2$, respective pixels in the SLM are set such that the polarization of light beams passing therethrough is not changed; as a consequence, the recombined beam B passes from output switching unit 150 in PIBS $120_2$ along a delay path axis that directs the beam into delay path apparatus $160_2$. The light beam is deflected in delay path apparatus $160_2$ such that it is incident on input switching unit 130 of PIBS $120_3$ in third optical switching unit $110_3$.

In operation, a plurality of light beams necessary for generating the necessary control signals for the device in which this system is employed, such as a phased array radar, pass simultaneously into the first optical switching unit. Respective manipulation of the linear polarization of the polarized constituent beams from each light beam in the PIBS of each optical switching unit determines whether a respective light beam passes along the delay path or the direct path in a given optical switching unit. The cumulative effect of these manipulations provides, at the output of the cascade of optical switching devices, a plurality of differentially time delayed optical signals. Conversion of these optical signals into corresponding electrical signals in converter 200 produces electrical signals that, for example, differentially actuate a predetermined ones of the elements in an antenna array.

Figure 3:
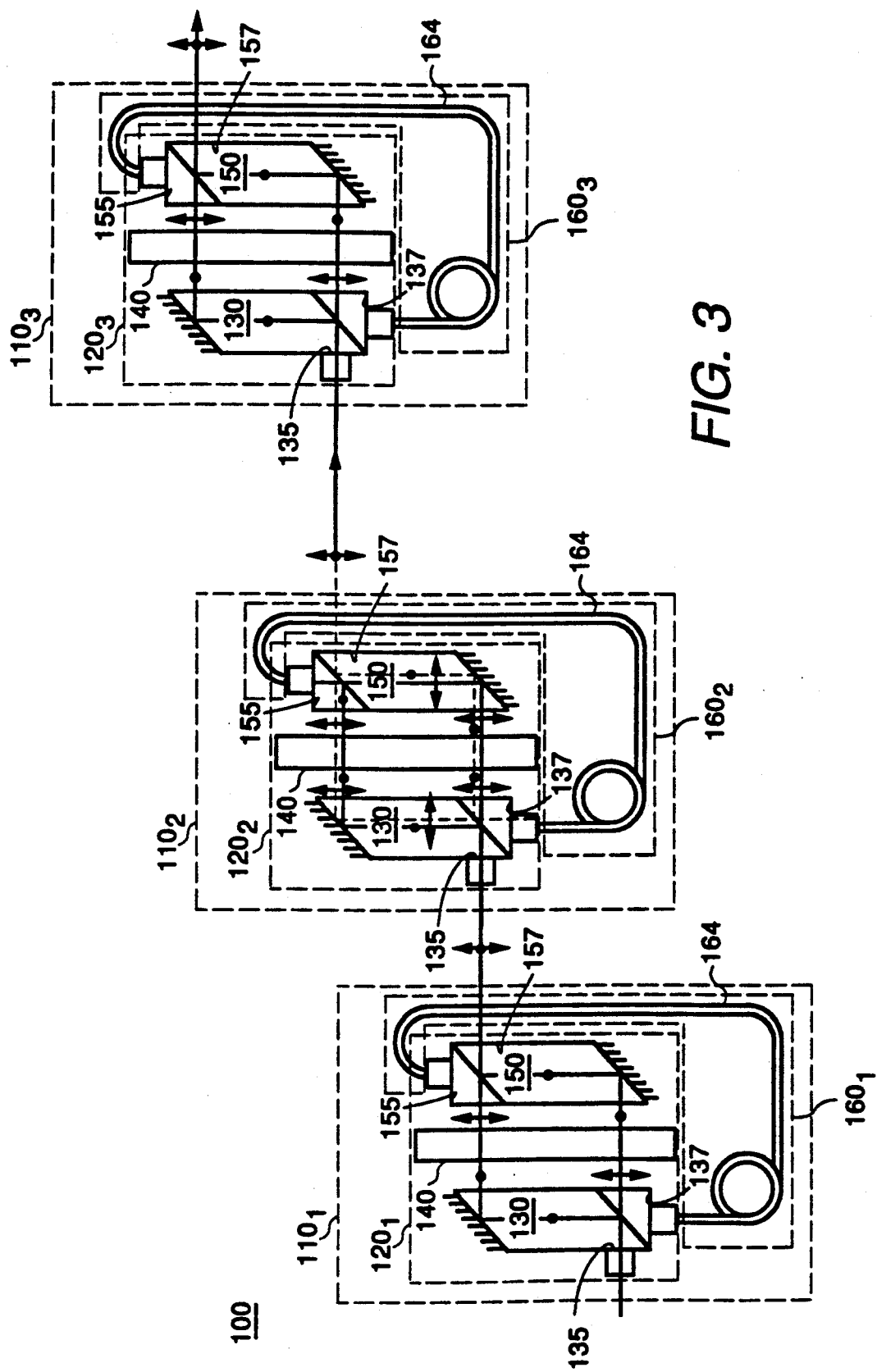
FIG. 3 is a schematic diagram of a portion of a second embodiment of an optical signal processing system comprising the present invention.

A second embodiment of the present invention is illustrated in FIG. 3. The components in this embodiment are as described above with respect to FIGS. 1 and 2 with the exception that in each optical switching unit 110 the delay path (illustrated comprising fiber optic cable delay units 164) directs light from a predetermined one of the output faces of output switching unit 150 of the respective PIBS into a predetermined one of the input faces of input switching unit 130 of the same PIBS. Each optical switching unit is thus independent, or self contained, in so much as only one optical coupling is necessary between optical switching units sequentially coupled in a cascade arrangement, with both delayed and undelayed light beams passing along the same coupling between optical switching units. As illustrated in FIG. 3, first optical switching unit $110_1$ is disposed such that incident unpolarized light beams from the light source or a preceding switching unit enter input optical switching unit 130 through first input face 135. Delay path apparatus $160_1$ is coupled between first output face 155 of output switching unit 150 in PIBS $120_1$ and second input face 137 of input switching unit 130 in PIBS $120_1$. Second output face 157 of second switching unit 150 in PIBS $120_1$ is coupled to first input face 135 of PIBS $120_2$ in second switching unit $110_2$.

In operation, the incident unpolarized light beam enters first PIBS $120_1$ and is directed to either first output face 155 or second output face 157 dependent on whether the polarization of the constituent beams is rotated as these beams pass through SLM 140 in PIBS $120_1$. As illustrated in FIG. 3, the pixels in SLM 140 in. PIBS $120_1$ are controlled to cause a polarization shift of 90°, and thus the recombined beam from output switching unit 150 of PIBS $120_1$ passes from second output face 157, which is coupled to provide the direct path to second optical switching unit $110_2$. For purposes of illustration, second PIBS $120_2$ is shown in FIG. 3 configured to switch the incident light beam into the delay path (the path of the incident beam is illustrated by a solid dark line). The SLM is controlled so as to not cause a rotation in the polarization of the respective constituent light beams passing through PIBS $120_2$ such that the recombined light beam is deflected to first output face 155 (in output switching unit 150 in PIBS $120_2$), at which point it passes along the delay path into delay path apparatus $160_2$ and is directed via fiber optic delay line 164 into second input face 137 of input switching unit 130 in PIBS $120_2$ (the path of the delayed optical signal is shown as a dashed line, which, for purposes of illustration only, is shown slightly offset from the solid line representing the incident beam). The unpolarized light passing from the delay path again passes through PIBS $120_2$, in which the respective pixels in the SLM are still set to cause polarization rotation of the constituent light beams passing therethrough. The light passing from the delay path is recombined in a beam that is directed to second output face 157 as it exits PIBS $120_2$ into PIBS $120_3$. The light beam can thus pass down the cascade and be time delayed as desired dependent on the settings of the pixels in each respective SLM in the respective optical switching units in the cascade.

The arrangement of FIG. 3 thus provides an independent optical switching unit that is readily coupled with similar units to form a cascade of sequentially coupled optical switching units.

Figure 4:
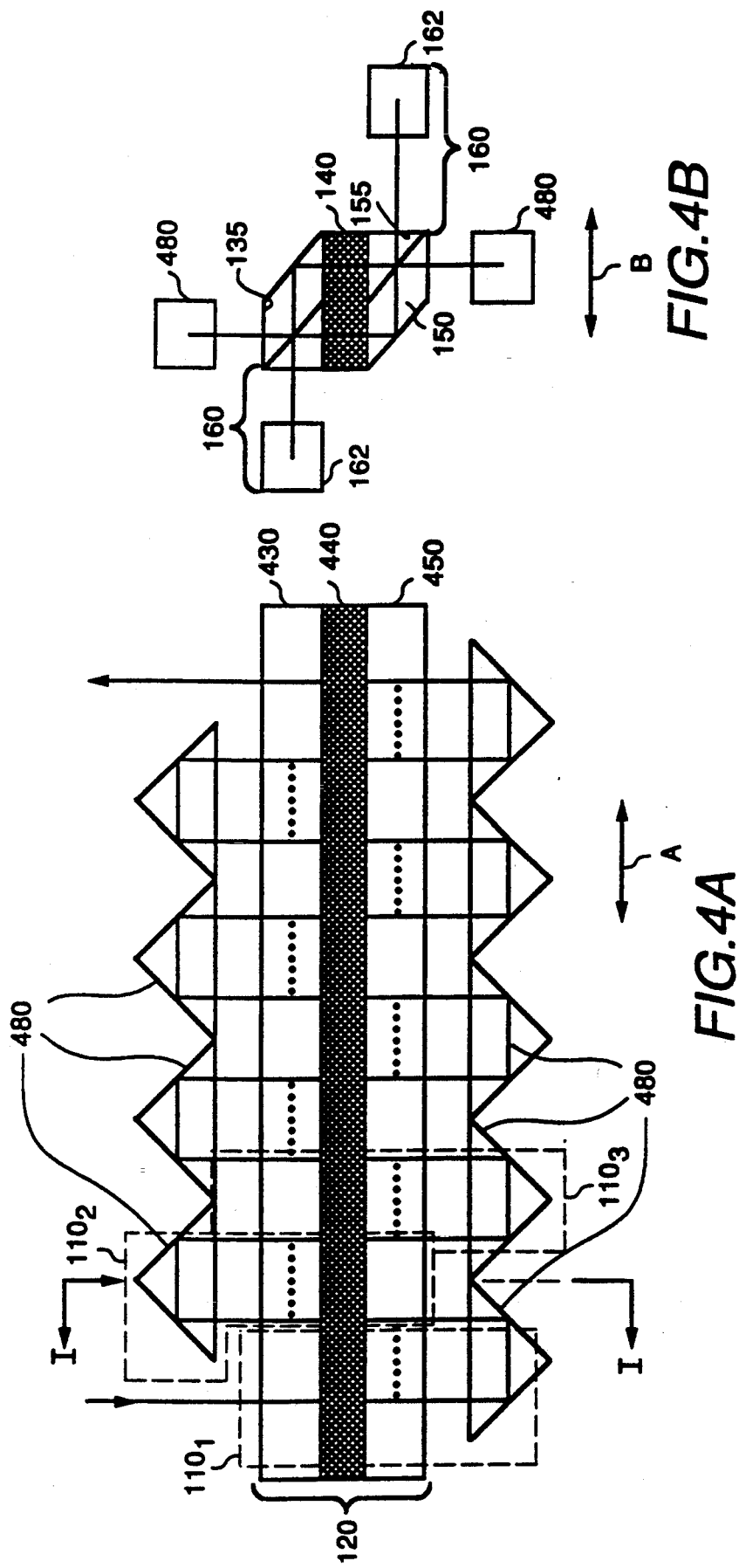
FIG. 4(A) is a schematic diagram of a portion of a third embodiment of an optical signal processing system comprising the present invention.
FIG. 4(B) is a cross-sectional view of a portion of the third embodiment of an optical signal processing system comprising the present invention taken along the line 1—1 in FIG. 4(A).

A third embodiment of the present invention is illustrated in FIGS. 4(A) and 4(B). The components in this embodiment are as described above with respect to FIGS. 1 and 3 except as noted in the following discussion. In this embodiment a plurality of optical switching units 110 are sequentially optically coupled together in a cascade along a first axis "A" in the plane of the drawing. Each optical switching unit comprises a respective PIBS 120 and a respective delay path apparatus 160 comprising, e.g., a mirror prism 162 (alternatively, a fiber optic cable can be used for directing light beams along the delay path). Further, a plurality of corner prisms 480 are coupled between respective output switching units 150 and input switching units 130 of sequentially coupled optical signal switching units 110 to deflect light passing from the PIBS in one switching unit into the PIBS in the next sequential optical switching unit such that the light is translated along first axis "A" between respective ones of the optical switching units.

The delay path apparatus associated with each optical switching unit 110 is disposed along a second axis "B" illustrated in FIG. 4(B). Axis "B" lies in a plane orthogonal to the plane of the first axis "A" (i.e., extending out of the plane of page of FIG. 4(A)) such that light deflected onto the delay path is deflected along the second axis into the respective delay path apparatus and thence into the input optical switching unit of the PIBS in the next sequential optical switching unit 110 (the portion of the delay path along the axis "A", i.e., that portion in which light in the delay path is translated along axis "A" to be aligned to enter the next sequential optical switching unit is illustrated in FIG. 4(A) as dashed lines across the respective output switching unit). Light passing through a cascade having this arrangement is thus deflected along three mutually orthogonal axes, that is axis "A" in the plane of FIG. 4(A), axis "B" extending out of the plane of FIG. 4(A), and through respective PIBSs ("up" and "down" in the plane of FIG. 4(A) between respective alternating corner prisms 480).

Individual components of each PIBS can advantageously be fabricated as a part of a larger block of that type of component. For example, input switching unit 130 in PIBS $120_1$ in first optical switching unit $110_1$ advantageously constitutes a portion of a first switching unit block 430, that is an integral elongated block comprising a beamsplitter and associated reflector, such that one block can be fabricated and segments of the block can then provide at least a portion of the respective switching units for PIBSs in sequentially coupled optical switching units. As the input and output switching units in each PIBS are structurally the same, portions of first switching unit block 430 comprise the input switching block of, e.g., first optical switching unit 11 01, and the contiguous portion comprises output switching unit 150 of second optical switching unit $110_2$ and so forth in an alternating fashion. A second switching block 450 is disposed to provide output switching unit 150 of first optical switching unit $110_1$; in the arrangement illustrated in FIGS. 4(A) and 4(B) the next sequential portion of block 450 forms the input optical switching unit for optical switching unit $110_2$. Similarly, respective SLMs in each PIBS advantageously constitute a portion of a polarization rotation switch block 440. Switch block 440 comprises an elongated substrate on which respective arrays of liquid crystals are disposed with the associated address circuitry for individual pixels.

Switch block 440 is optically coupled to first switching unit block 430 and second switching unit block 450 to form a block PIBS, with individual segments of that block constituting the respective PIBSs in the cascade of optical switching units.

In this "folded" or integrated arrangement illustrated in FIGS. 4(A) and 4(B) light is directed along three mutually orthogonal axes (two perpendicular axes in the plane of FIG. 4(A), and another extending out of the plane of FIG. 4(A)) as it passes along the respective direct paths, delay paths, and inter-switching unit coupling segments. This arrangement allows compact packaging of a cascade of optical signal switching units and presents an arrangement that is readily fabricated with the use of the beamsplitter and polarization rotation switch blocks.

Figure 5:
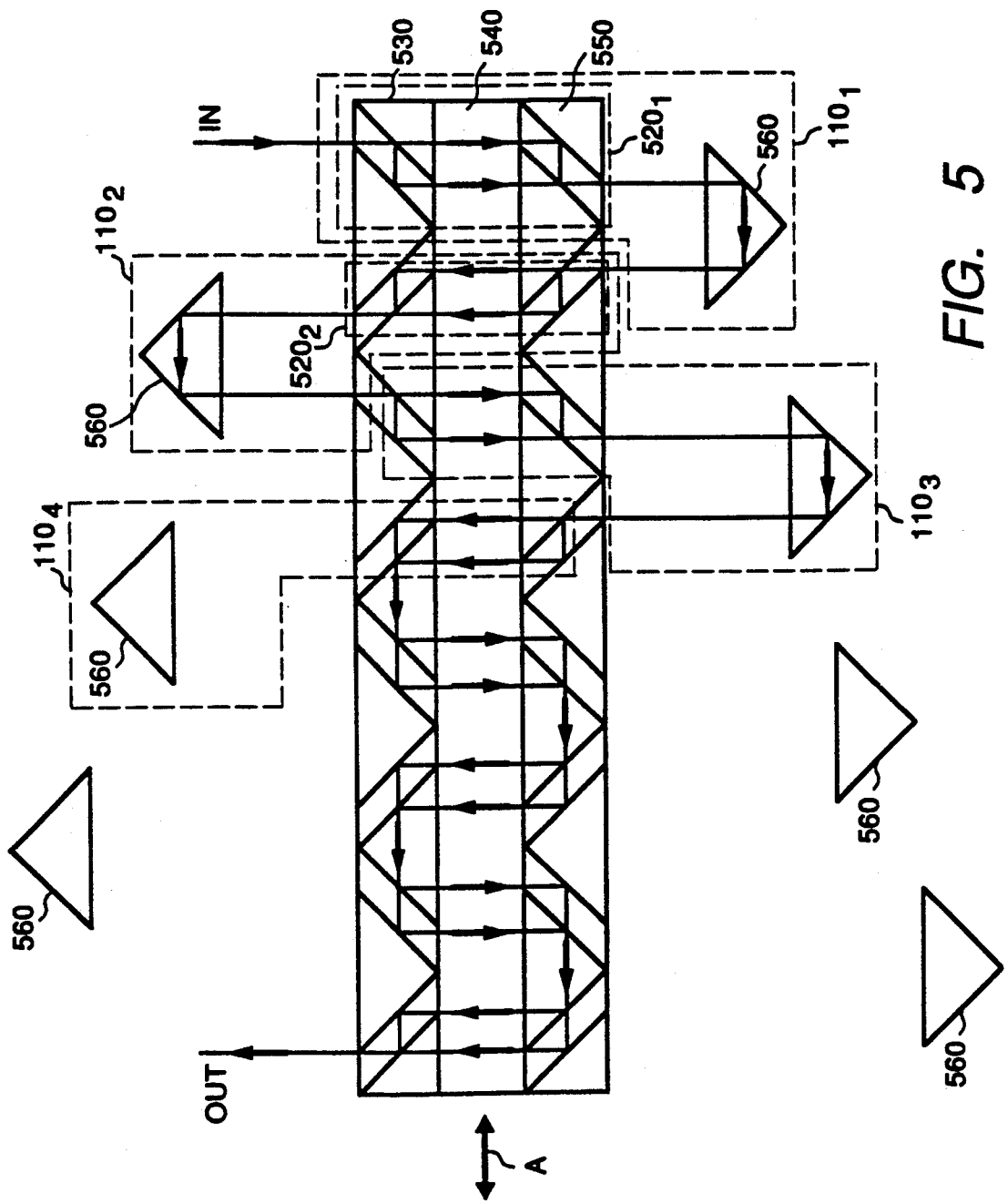
FIG. 5 is a schematic diagram of a portion of a fourth embodiment of an optical signal processing system comprising the present invention.

A still further embodiment of this invention is illustrated in FIG. 5. The cascade arrangement of optical switching units illustrated in this Figure provides for switching of the processed light beams in two dimensions (that is, the device is not "folded" as described above with respect to FIG. 4). In this arrangement the respective PIBSs advantageously comprise portions of a first block switching unit 530, a block polarization rotation switch 540, and a second block switching unit 550 as described above with respect to the device illustrated in FIGS. 4(A) and 4(B). Each respective optical switching unit 110 comprises a respective PIBS 520, and a delay path path apparatus 560 comprising a mirror prism or the like, such as a fiber optic delay line as described above with regard to FIG. 1. A plurality of optical switching units are sequentially optically coupled, and at least a portion of the respective PIBSs are aligned along a first axis noted in FIG. 5 by the letter "A". Respective delay path apparatuses in alternating ones of optical switching units are disposed on opposite sides of the plurality of respective PIBSs disposed along first axis A.

In operation, light beams incident on the cascade of optical switching devices pass into first optical switching unit $110_1$ and are directed by PIBS $520_1$ onto a direct path to enter the next sequential optical switching unit $110_2$ or onto a delay path into respective delay path apparatus dependent on the polarization rotation selected for the SLM in PIBS $520_1$, as described above. This arrangement facilitates fabrication of a cascade of optical switching units as a polarization rotation switch block can be used for at least portions of the plurality of SLMs in respective sequentially coupled optical switching units.

Each of the embodiments described above further has a structure that is readily adapted to fabricating a device having relatively small time delays, that is, the length of the delay path can be made relatively short. Short delay times are advantageous in allowing the use of higher frequencies in phased array radars. In each of the embodiments of this invention, the delay path apparatus can be disposed in close physical proximity to the polarizing beamsplitter/spatial light modulator combinations to provide an optical switching unit capable of generating a relatively short time (e.g., picosecond or shorter) delay in an optical signal. Further, close proximity of the delay path apparatus with the respective PBSs and SLMs makes possible a structure in which there is a minimal or no air gap between the delay path assembly and the PBS, which reduces the possibility of light beams being deflected in passing from one optical medium, e.g., the glass of the PBS, through air, to a second optical medium, such as the glass of the mirror prism assembly.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An optical signal control system comprising a polarization independent beamsplitter switch (PIBS) and a delay path apparatus, said delay path apparatus being optically coupled to said PIBS, said PIBS and said delay path apparatus together comprising an optical switching unit.

2. The system of claim 1 wherein said PIBS comprises:
    an input switch unit having an input polarizing beam splitter (PBS);
    a spatial light modulator (SLM) optically coupled to said input switch unit; and
    an output switch unit having an output PBS, said output switch unit being optically coupled to said SLM.

3. The system of claim 2 wherein said input PBS comprises a cube polarizing beam splitter having mutually orthogonal first and second input axes, and an optical deflector disposed to deflect incident light beams into said SLM;
    said output PBS comprising a cube polarizing beam splitter having mutually orthogonal first and second output axes and an optical deflector disposed to deflect light beams passing from said SLM along a selected path into said output PBS such that incident light passes from said PIBS along either a direct path or a delay path dependent on the input axis along which the incident light enters said input switching unit and the polarization rotation imparted by the SLM pixels to light passing therethrough.

4. The system of claim 3 wherein said SLM comprises an array of independently controllable liquid crystal pixels.

5. The system of claim 4 wherein said delay path apparatus comprises a light deflection device selected from the group consisting of prisms, mirrors, and optical fibers.

6. An optical signal control system comprising a plurality of optical switching units sequentially optically coupled in a cascade; each of said optical switching units comprising a polarization independent beamsplitter switch (PIBS) and a delay path apparatus, said delay path apparatus being optically coupled to said PIBS, 7. The system of claim 6 wherein said PIBS comprises:
    an input switch unit having an input polarizing beam splitter (PBS);
    a spatial light modulator (SLM) optically coupled to said input switch unit; and
    an output switch unit having an output PBS, said output switch unit being optically coupled to said SLM.

8. The system of claim 7 wherein said SLM comprises an array of independently controllable liquid crystal pixels.

9. The system of claim 8 wherein said delay path apparatus comprises a light deflection device selected from the group consisting of prisms, mirrors, and optical fibers.

10. The system of claim 9 wherein one of said delay path apparatuses is coupled between the output PBS of its respective optical switching unit and the input PBS of the next sequential optical switching unit in the cascade.

11. The system of claim 9 wherein at least one of said delay path apparatuses is coupled between the the output PBS of its respective optical switching unit and a selected one of the input axes of the respective input PBS of said respective switching unit.

12. The system of claim 10 wherein each of said optical switching units is disposed along a first axis.

13. The system of claim 12 wherein at least a portion of input and output switch units in respective ones of said plurality of sequentially coupled optical switching units comprise respective sequentially adjoining contiguous segments of a switching unit block.

14. The system of claim 12 wherein at least a portion of SLMs in respective ones of said sequentially coupled optical switching units comprise respective sequentially adjoining contiguous segments of a polarization rotation switch block.

15. The system of claim 13 wherein each of said delay path apparatuses is coupled to respective optical switching units along an axis disposed orthogonally to said first selected axis.

16. The system of claim 15 wherein each of said delay path apparatuses is oriented along a second selected axis.

17. The system of claim 16 wherein said second selected axis is orthogonal to said first selected axis.

18. The system of claim 17 wherein said first and second selected axes are coplanar.

19. The system of claim 11 wherein at least one of said delay assemblies is disposed with respect to PIBSs to which it is coupled such that substantially no air gap exists at the coupling between said delay path apparatus and corresponding ones of said PBSs.

20. The system of claim 6 further comprising a lens optically coupled to one of said optical switching units and disposed to collimate light beams passing therethrough.

* * * * *